(12) United States Patent
Rapoport et al.

(10) Patent No.: US 11,683,234 B2
(45) Date of Patent: Jun. 20, 2023

(54) SERVER OUTLIER DETECTION

(71) Applicant: Netflix, Inc., Los Gatos, CA (US)

(72) Inventors: Roy Rapoport, Pacifica, CA (US); Christopher Sanden, San Jose, CA (US); Cody Rioux, San Francisco, CA (US); Gregory Burrell, Morgan Hill, CA (US)

(73) Assignee: NETFLIX, INC., Los Gatos, CA (US)

(*) Notice: Subject to any disclaimer, the term of this patent is extended or adjusted under 35 U.S.C. 154(b) by 639 days.

(21) Appl. No.: 15/042,116

(22) Filed: Feb. 11, 2016

(65) Prior Publication Data

US 2017/0019308 A1    Jan. 19, 2017

Related U.S. Application Data

(60) Provisional application No. 62/192,523, filed on Jul. 14, 2015.

(51) Int. Cl.
*H04L 41/12* (2022.01)
*G06F 11/34* (2006.01)
*H04L 67/10* (2022.01)

(52) U.S. Cl.
CPC .......... *H04L 41/12* (2013.01); *G06F 11/3409* (2013.01); *G06F 11/3452* (2013.01); *H04L 67/10* (2013.01)

(58) Field of Classification Search
None
See application file for complete search history.

(56) References Cited

U.S. PATENT DOCUMENTS

2005/0283354 A1* 12/2005 Ouimet .................. G06Q 10/10
703/26
2013/0346594 A1    12/2013 Banerjee et al.
(Continued)

FOREIGN PATENT DOCUMENTS

WO    2007048738 A1    5/2007

OTHER PUBLICATIONS

Dani et al. "Unsupervised Anomaly Detection for Aircraft Condition Monitoring System", IEEE (Year: 2015).*
(Continued)

*Primary Examiner* — Mohamed A. Wasel
*Assistant Examiner* — Mohammad Yousef A. Mian
(74) *Attorney, Agent, or Firm* — Artegis Law Group, LLP

(57) ABSTRACT

One embodiment of the invention disclosed herein provides techniques for detecting and remediating an outlier server in a distributed computer system. A control server retrieves a group of time-series data sets associated with a first time period, where each time-series data set represents a performance metric for a different server in a group of servers. The control server generates a cluster that includes two or more of the time-series data sets, where the performance metric for each server that is associated with one of the time-series data sets in the cluster is within a threshold distance from the performance metric for the servers that are associated with the other time-series data sets in the cluster. The control server determines that a particular time-series data set corresponds to a server included in the group of servers and is not included in the cluster, and marks the server as an outlier server.

19 Claims, 6 Drawing Sheets

(56) References Cited

U.S. PATENT DOCUMENTS

| | | | | | |
|---|---|---|---|---|---|
| 2014/0269339 | A1* | 9/2014 | Jaafar | ............... | H04L 41/142 370/241 |
| 2015/0081881 | A1* | 3/2015 | Eaton | ............... | H04L 47/785 709/224 |
| 2016/0091948 | A1* | 3/2016 | Mitchell | ............ | G06F 1/3206 713/340 |
| 2016/0125365 | A1* | 5/2016 | Fix | ..................... | G06Q 10/20 705/305 |
| 2016/0140208 | A1* | 5/2016 | Dang | ............. | G06F 17/30943 707/737 |

OTHER PUBLICATIONS

Becker, et al., "Mantis: Netflix's Event Stream Processing System," QConSF 2014 Talk on Netflix Mantis, a stream processing sytem, Oct. 26, 2014, 36 pages, http://www.slideshare.net/g9yuayon/qcon-talk-on-netflix-mantis-a-stream-processing-system.

Christensen, "Introducing Hystrix for Resilience Engineering", The Netflix Tech Blog, Nov. 26, 2012, 11 pages, http://techblog.netflix.com/2012/11/hystrix.html.

"Cluster Analysis", Wikipedia 18 pages, https://en.wikipedia.org/wiki/Cluster_analysis.

"Introducing Atlas: Netflix's Primary Telemetry Platform", The Netflix Tech Blog, Dec. 12, 2014, 11 pages.

"Data stream mining", Wikipedia, 5 pages, https://en.wikipedia.org/wiki/Data_stream_mining.

"DBSCAN", Wikipedia, 7 pages, https://en.wikipedia.org/wiki/DBSCAN.

"F1 score", Wikipedia, 3 pages, https://en.wikipedia.org/wiki/F1_score.

Harris, "Visualizing DBSCAN Clustering", Jan. 24, 2015, 2 pages, https://www.naftaliharris.com/blog/visualizing-dbscan-clustering/.

"k-means clustering" Wikipedia, 13 pages https://en.wikipedia.org/wiki/K-means_clustering.

"Lightning-fast cluster computing", Apache Spark, 4 pages, https://spark.apache.org/.

Mavinkurve, et al., "Improving Netflix's Operational Visibility with Real-Time Insight Tools", The Netflix Tech Blog, Jan. 16, 2014, 11 pages, http://techblog.netflix.com/2014/01/improving-netflixs-operational.html.

"Mixture model", Wikipedia, 13 pages, https://en.wikipedia.org/wiki/Mixture_model.

"Online machine learning", Wikipedia, 11 pages, https://en.wikipedia.org/wiki/Online_machine_learning.

"Precision and recall", Wikipedia, 4 pages, https://en.wikipedia.org/wiki/Precision_and_recall.

"Simulated annealing", Wikipedia, 7 pages, https://en.wikipedia.org/wiki/Simulated_annealing.

"Unsupervised learning", Wikipedia, 4 pages, https://en.wikipedia.org/?title=Unsupervised_learning.

Yuan, et al., "Scryer: Netflix's Predictive Auto Scaling Engine—Part 2", The Netflix Tech Blog, Dec. 4, 2013, 11 pages, http://techblog.netflix.com/2013/12/scryer-netflixs-predictive-auto-scaling.html.

International Search Report for Application No. PCT/US2016/042158, dated Oct. 10, 2016, 13 pages.

Varun Chandola et al: "Anomaly detection",ACM COMPUTING SURVEYS,vol. 41, No. 3, Jul. 1, 2009 (Jul. 1, 2009), pp. 1-58, XP55217605,ISSN: 0360-0300, DOI: 10.1145/1541880.1541882.

* cited by examiner

SERVER OUTLIER DETECTION

CROSS-REFERENCE TO RELATED APPLICATIONS

This application claims the benefit of U.S. provisional patent application titled, "SERVER OUTLIER DETECTION," filed on Jul. 14, 2015 and having Ser. No. 62/192,523. The subject matter of this related application is hereby incorporated herein by reference.

BACKGROUND OF THE INVENTION

Field of the Invention

Embodiments of the present invention relate generally to computers and computer networks and, more specifically, to server outlier detection.

Description of the Related Art

A variety of online computer services are provided by a group of two or more servers, where any server in the group can respond to incoming service requests received from a client (also referred to herein as an "endpoint device"). A system that provides computer services via multiple servers is typically considered to be a distributed computer system. A distributed computer system could deploy any number of two or more servers for servicing requests, typically ranging from as few as two servers to tens of thousands of servers. Further, the number of servers may increase or decrease dynamically based on demand. In such distributed computer systems, during normal operation, a particular client transmits a request to the computer service via a distributed computer network. Any server in the group of servers that is capable of servicing the request may receive the request and respond to the request by transmitting a corresponding response message to the client. The servers within a distributed computer system may be configured to service any one or more types of service requests.

In one example, a distributed computer system could be deployed to stream media content from one or more servers to requesting clients. A client could request a set of recommended media titles for viewing. A cluster of servers equipped to respond to the recommendation request would respond with a set of recommended media titles based on various factors, such as one or more preferences specified by the requesting client, the viewing history of the requesting client, and the viewing history of clients with similar characteristics of the requesting client. Based on the recommendations, the client could then request that a particular media title be streamed to the client. A cluster of servers equipped to respond to streaming requests would then respond to such a request by streaming the requested media title to the client. The client could further request that one or more attributes be changed in a profile associated with the client, such as a user name, password, preference settings, or payment information. A cluster of servers equipped to respond to profile update requests would respond with a message indicating whether the requested profile changes were successfully implemented.

Over time, one or more servers in a distributed computer system may encounter various problems, such as complications arising from hardware or software defects. In more extreme cases, such complications can cause the affected server(s) to fail completely. A system operator who is monitoring the performance of the different servers within a distributed computer system may be able to detect the complete failure of a particular server and may respond by terminating operation of the server or taking the server offline for further analysis. In less extreme cases, the above complications can cause the affected server(s) to behave in an uncharacteristic manner, such as servicing requests with increased latency, increasing error rates when servicing requests, and/or consuming an atypical amount of processing, memory, or system disk resources for routine tasks and operations.

A system operator who is monitoring the performance of the different servers with a distributed computer system may fail to detect a server that is behaving in an uncharacteristic manner, particularly when the change in behavior is subtle or when the number of deployed servers in the distributed system is large. In particular, in such less extreme cases, a defective server may respond to "health checks" and show normal system-level metrics but nonetheless may be operating in a sub-optimal manner relative to other servers. As a result, clients being serviced by the defective server(s) may experience reduced overall system performance, leading to user dissatisfaction with respect to the relevant computer service(s) being offered.

As the foregoing illustrates, what is needed in the art are more effective ways to detect and remediate defective servers in a distributed computer system.

SUMMARY OF THE INVENTION

One embodiment of the present application sets forth a method for detecting and remediating an outlier server in a distributed computer system. The method includes retrieving a first plurality of time-series data sets associated with a first time period, wherein each time-series data set included in the first plurality of time-series data sets represents a performance metric for a different server included in a plurality of servers. The method further includes generating a first cluster that includes two or more of the time-series data sets included in the first plurality of time-series data sets, wherein the performance metric for each server included in the plurality of servers that is associated with one of the time-series data sets included in the first cluster is within a threshold distance from the performance metric for the servers included in the plurality of servers that are associated with the other time-series data sets included in the first cluster. The method further includes determining that a first time-series data set included in the first plurality of time-series data sets corresponds to a first server included in the plurality of servers and is not included in the first cluster. The method further includes marking the first server as an outlier server.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that the control server automatically detects outlier servers based on one or more user-specified metrics and either takes the outlier server offline or terminates the outlier server after detection. The control server detects and remediates such outlier servers faster relative to prior techniques. As a result, the offline or terminated outlier server is typically replaced automatically with a new, and presumably healthy, server. As a result, clients experience improved performance for computer services delivered via a distributed computer system.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
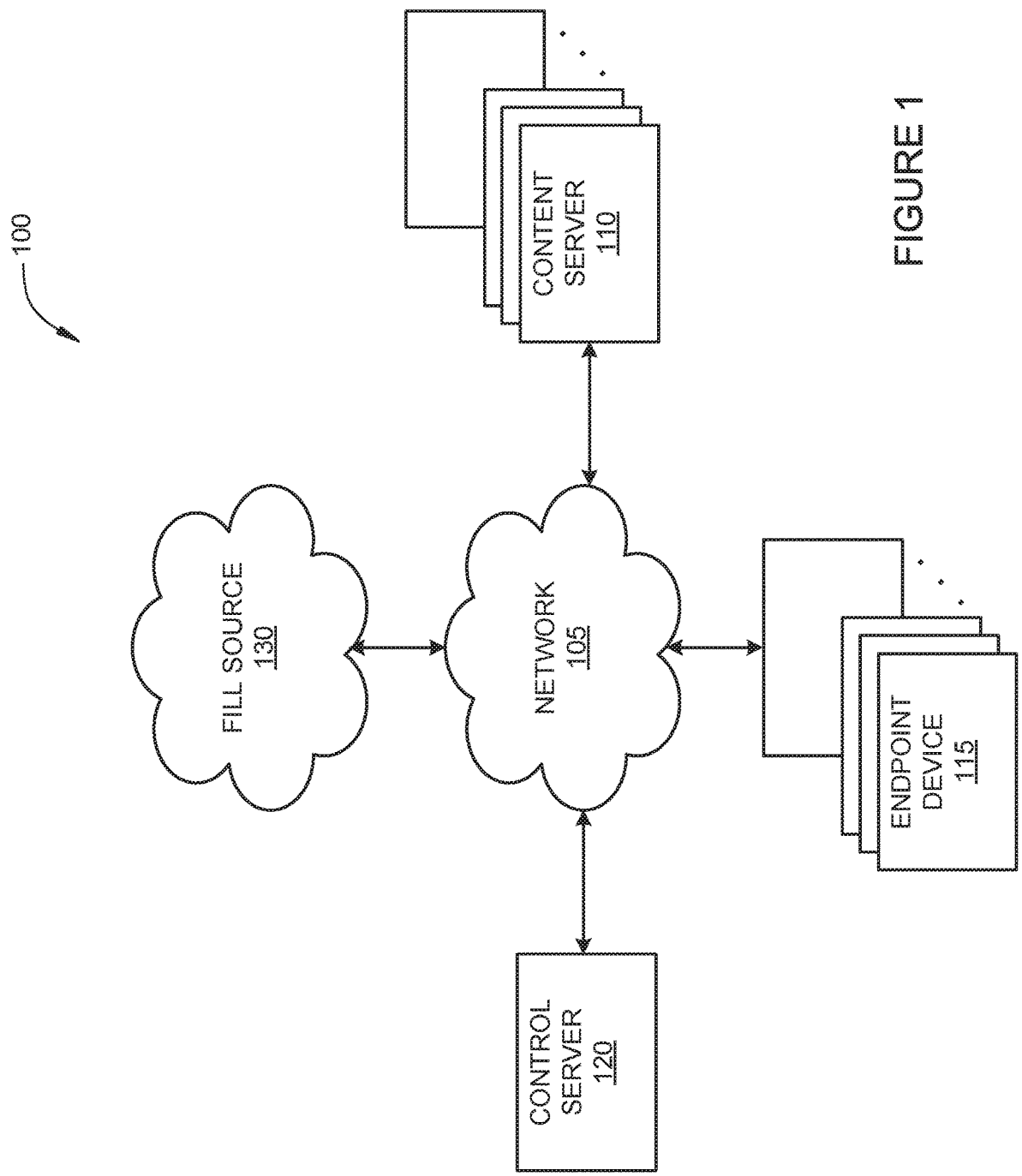
FIG. 1 illustrates a distributed computer system configured to implement one or more aspects of the present invention.

FIG. 1 illustrates a distributed computer system 100 configured to implement one or more aspects of the present invention. As shown, the distributed computer system 100 includes, without limitation, content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with a fill source 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the fill source 130 may include an online storage service (e.g., Amazon® Simple Storage Service, Google® Cloud Storage, etc.) in which a catalog of files, including thousands or millions of files, is stored and accessed in order to fill the content servers 110. Although only a single fill source 130 is shown in FIG. 1, in various embodiments multiple fill sources 130 may be implemented to service requests for files.

Figure 2:
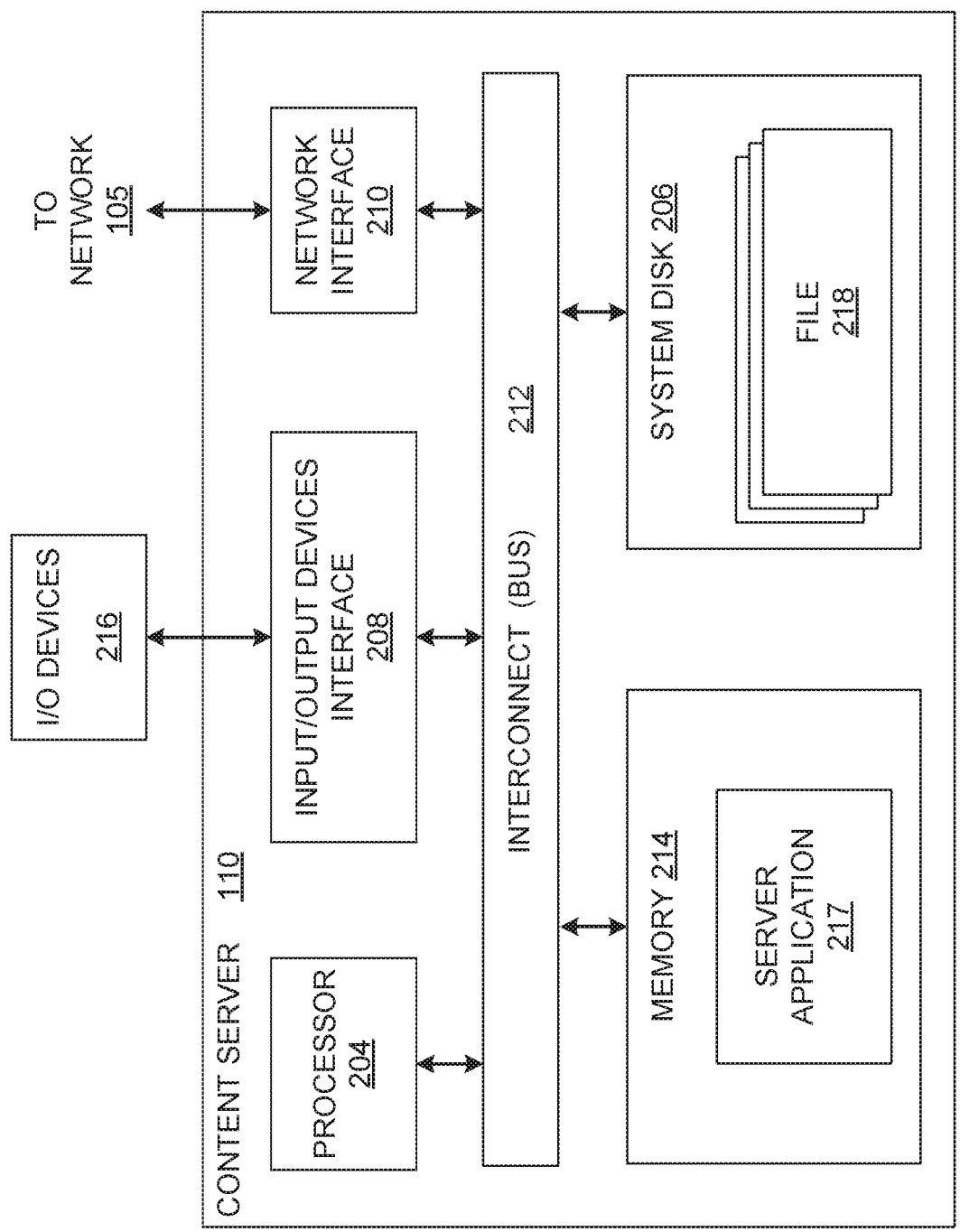
FIG. 2 is a more detailed block diagram of the content server of FIG. 1, according to various embodiments of the present invention.

FIG. 2 is a more detailed block diagram of the content server 110 of FIG. 1, according to various embodiments of the present invention. As shown, the content server 110 includes, without limitation, a processor 204, a system disk 206, an input/output (I/O) devices interface 208, a network interface 210, an interconnect 212, and a system memory 214.

The processor 204 may be any technically feasible form of processing device configured process data and execute program code. Processor 204 could be, for example, a central processing unit (CPU), a graphics processing unit (GPU), an application-specific integrated circuit (ASIC), a field-programmable gate array (FPGA), and so forth. The processor 204 is configured to retrieve and execute programming instructions, such as server application 217, stored in the system memory 214. Similarly, the processor 204 is configured to store application data (e.g., software libraries) and retrieve application data from the system memory 214. The interconnect 212 is configured to facilitate transmission of data, such as programming instructions and application data, between the processor 204, the system disk 206, I/O devices interface 208, the network interface 210, and the system memory 214. The I/O devices interface 208 is configured to receive input data from I/O devices 216 and transmit the input data to the processor 204 via the interconnect 212. For example, I/O devices 216 may include one or more buttons, a keyboard, a mouse, and/or other input devices. The I/O devices interface 208 is further configured to receive output data from the processor 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Figure 3:
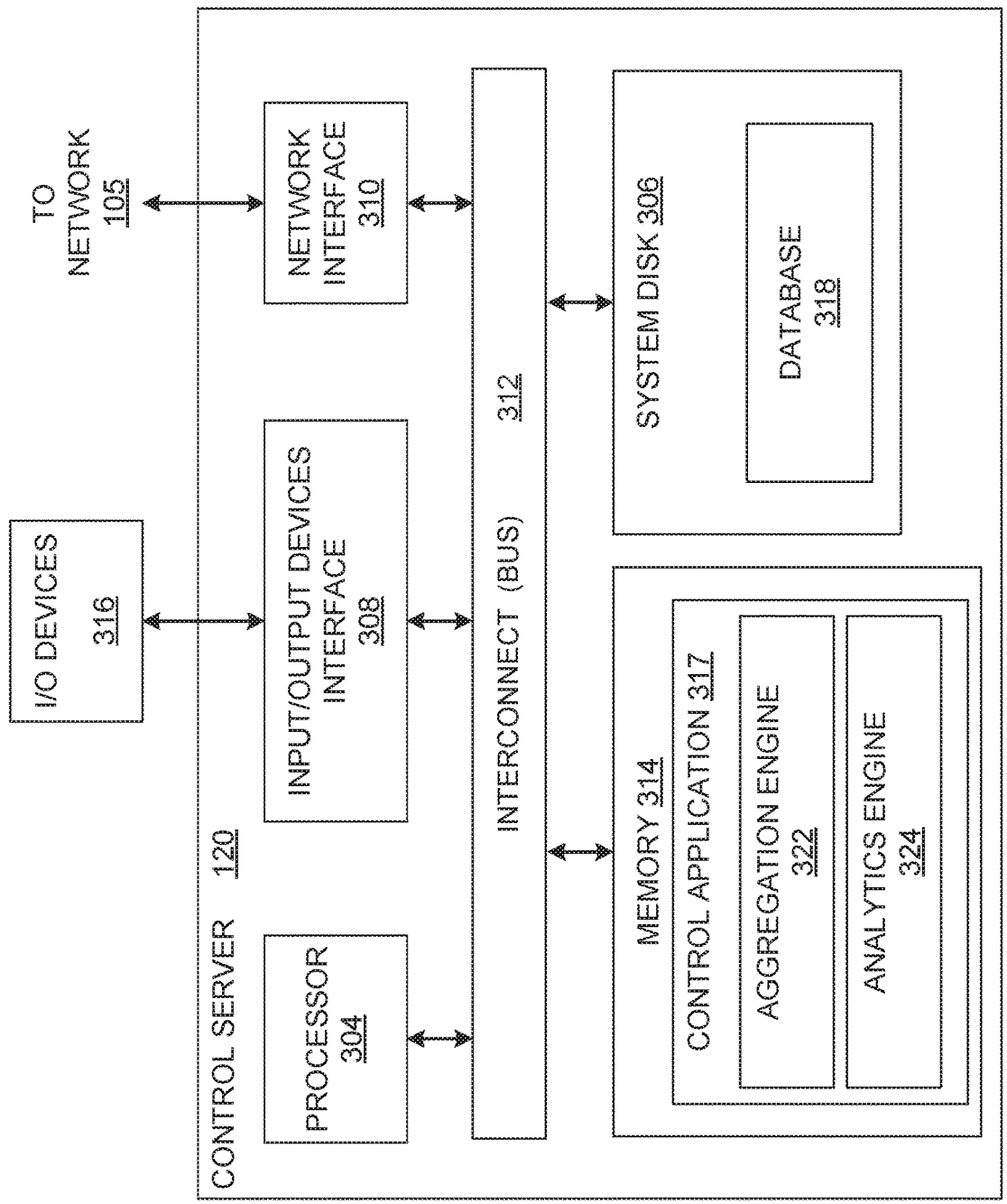
FIG. 3 is a more detailed block diagram of the control server of FIG. 1, according to various embodiments of the present invention.

FIG. 3 is a more detailed block diagram of the control server 120 of FIG. 1, according to various embodiments of the present invention. As shown, the control server 120 includes, without limitation, a processor 304, a system disk 306, an input/output (I/O) devices interface 308, a network interface 310, an interconnect 312, and a system memory 314.

The processor 304 may be any technically feasible form of processing device configured process data and execute program code. Processor 304 could be, for example, a central processing unit (CPU), a graphics processing unit (GPU), an application-specific integrated circuit (ASIC), a field-programmable gate array (FPGA), and so forth. The processor 304 is configured to retrieve and execute programming instructions, such as control application 317, stored in the system memory 314. Similarly, the processor 304 is configured to store application data (e.g., software libraries) and retrieve application data from the system memory 314 and a database 318 stored in the system disk 306. The interconnect 312 is configured to facilitate transmission of data between the processor 304, the system disk 306, I/O devices interface 308, the network interface 310, and the system memory 314. The I/O devices interface 308 is configured to transmit input data and output data between the I/O devices 316 and the processor 304 via the interconnect 312. The system disk 306 may include one or more hard disk drives, solid state storage devices, and the like. The system disk 206 is configured to store a database 318 of information associated with the content servers 110, the fill source(s) 130, and the files 218.

The system memory 314 includes a control application 317 configured to access information stored in the database 318 and process the information to determine the manner in which specific files 218 will be replicated across content servers 110 included in the distributed computer system 100. The control application 317 may further be configured to receive and analyze performance characteristics associated with one or more of the content servers 110 and/or endpoint devices 115. More specifically, the control application 317 includes an aggregation engine 322 and an analytics engine 324, as now described.

The aggregation engine 322 retrieves raw data from the database 318, where the raw data in the database 318 includes time-stamped values for various performance metrics, also referred to herein as "metrics," measured for each content server 110 in the group of content servers. The time-stamped metrics include any relevant metrics related to server performance, including, without limitation, response latency, error rate, processor utilization, memory utilization, and system disk utilization. The aggregation engine 322 forms time-series data sets from the retrieved data by sorting the raw data by metric and by content server 110, and then arranges the raw data in time order. In this manner, the aggregation engine 322 creates a time-series data set for each metric and for each content server 110 represented in the raw data stored in the database 318. The aggregation engine 322 makes the aggregated time-series data available for retrieval by the analytics engine 324.

The analytics engine 324 retrieves aggregated time-series data created by the aggregation engine 322. The analytics engine 324 processes the aggregated time-series data by receiving input data in a configuration phase and then performing analysis on the aggregated time-series data, based on the received input data, in an analysis phase.

In the configuration phase, the analytics engine 324 receives a selection of one or more relevant metrics for analysis. The selection of the relevant metrics may be determined via any technically feasible technique, including, without limitation, receiving a user selection of the metrics, and retrieving the selection of the metrics from a configuration file. The analytics engine 324 retrieves aggregated time-series data for the one or more metrics for at least a portion of the content servers 110. The analytics engine 324 formats the retrieved aggregated time-series data for display on a display device. In some embodiments, if more than one metric is selected, the analytics engine 324 creates a time series of a composite metric for each content server 110 in the portion of content servers 110. The analytics engine 324 computes the composite metric via any technically feasible technique, including, without limitation, a sum of the individual metrics, a simple average of the individual metrics, and a weighted sum of the individual metrics. The analytics engine 324 causes the aggregated time-series data to be displayed on the display device.

The analytics engine 324 receives a quantity of outlier servers present in the retrieved aggregated time-series data. For example, a user, such as a system operator, could view the displayed aggregated time-series data and could specify that the displayed data shows that there are no outlier servers represented by the displayed data. Alternatively, the user could view the displayed aggregated time-series data and could specify that the displayed data shows that there are one, two, or more outlier servers represented by the displayed data. The user could also specify that one or more outlier servers are expected outlier servers. A particular server may be specified as an expected outlier server for various reasons, including, without limitation, the server is performing maintenance operations, the server is executing a test version of an application program that is different from a corresponding application program executed by other servers in the group of servers, and the server is known to have a hardware configuration that is different from other servers in the group of servers. In some embodiments, the user may further specify a minimum duration before a content server 110 is considered to be an outlier server. For example, the user could specify that a content server 110 is considered to be an outlier server when the time series for the content server 110 fails to be included in a cluster for a given number of analysis periods in a row. That is, a content server 110 could be considered as an outlier server if the time series for the content server 110 fails to be included in a cluster for three consecutive analysis periods. Alternatively, the user could specify that a content server 110 is considered to be an outlier server when the time series for the content server 110 fails to be included in a cluster for a given number of analysis periods out of a specified number of analysis periods. That is, a content server 110 could be considered as an outlier server if the time series for the content server 110 fails to be included in a cluster for three of the last five analysis periods.

After completing the configuration phase, the analytics engine 324 enters the analysis phase. The analytics engine 324 performs clustering analysis on the time-series data for the group of content servers 110. More specifically, the analytics engine 324 clusters time-series data for the content servers 110 into one or more clusters, based on the aggregated metrics and the specified quantity of outlier servers. In some embodiments, the analytics engine 324 may normalize the time-series data prior to clustering such that all metric values included in the time-series data fall between specified limits. For example, the analytics engine 324 could normalize the time-series data such that all metric values included in the time-series data fall between 0.0 and 1.0 inclusive. The analytics engine 324 may cluster the time series via any technically feasible approach, including, without limitation, density-based spatial clustering of applications with noise (DBSCAN), k-means clustering, and Gaussian-mixture-based models. In general, cluster analysis is an unsupervised machine learning technique that groups time series into clusters without the need to create training data sets that include one or more outliers. That is, the analytics engine 324 performs cluster analysis on time-series data without user intervention or prior training. The analytics engine 324 creates clusters, where each cluster includes time series that represent a subset of the content servers 110 that, with respect to the specified metrics, are more similar to each other than to other content servers 110 not represented by the time series in the cluster.

In some embodiments, the analytics engine 324 may automatically calculate the relevant parameters for the relevant clustering approach, including, without limitation, DBSCAN clustering, k-means clustering, and Gaussian-mixture-based models. With particular regard to DBSCAN clustering, the analytics engine 324 may automatically calculate the relevant parameters for DBSCAN from the time-series data with relative ease, as compared with Gaussian-mixture-based models. Further, DBSCAN more readily determines which time series belong to a particular cluster and which time series do not belong to the cluster, relative to k-means clustering which typically only determines which time series are furthest from the center of a particular cluster.

Using DBSCAN, the analytics engine 324 determines two parameters based on the aggregated time-series data and on the data received during the configuration phase. These two parameters are a distance measure, also referred to herein as epsilon or $\epsilon$, and a minimum cluster size. In some embodiments, the distance measure may indicate the maximum Euclidean distance that the time-series data for a particular content server 110 may be from the center of a cluster and still be considered as part of the cluster. The minimum cluster size indicates the minimum number of content servers 110 that may be considered a cluster. The minimum cluster size may be specified as an absolute number or as a percentage of the total. For example, if the minimum cluster size is 5, then a cluster would not be formed with 4 or fewer time series corresponding to content servers 110 exhibiting similar behavior but would be formed with 5 or more time series. if the minimum cluster size is 10% and the current number of cluster servers is 100, then a cluster would not be formed with 9 or fewer time series corresponding to content servers 110 exhibiting similar behavior but would be formed with 10 or more time series.

In some embodiments, the value of $\epsilon$ and the minimum cluster size may be determined via a calibration process referred to herein as simulated annealing. Via simulated annealing, the analytics engine 324 may set an initial value of $\epsilon$ and a minimum cluster size. Then, the analytics engine 324 may gradually reduce the value of $\epsilon$ over a series of steps until the number of detected outlier servers is one greater than the number of outlier servers identified during the configuration phase. The analytics engine 324 may gradually increase the value of $\epsilon$ over a series of steps until the number of detected outlier servers is equal to the number of outlier servers identified during the configuration phase. At that value of $\epsilon$, the analytics engine 324 identifies the correct number of outlier servers. In some embodiments, the amount by which to increase the value of $\epsilon$ at each step may be based on the number of steps over which $\epsilon$ was decreased. For example, the analytics engine 324 could gradually increase the value of $\epsilon$ over a series of "x" steps until the number of detected outlier servers is equal to the number of outlier servers identified during the configuration phase. The analytics engine 324 could then gradually increase the value of $\epsilon$ by "log(x)" per step over a series of steps until the number of detected outlier servers is equal to the number of outlier servers identified during the configuration phase.

Once the value of $\epsilon$ and the minimum cluster size are determined, the analytics engine 324 gathers time-series data for the specified metrics for each content server 110 for an incremental duration of time, referred to as an incremental analysis period. The analytics engine 324 clusters the time series for the content servers 110 based on the time-series data for the incremental period of time. In some embodiments, the analytics engine 324 may normalize the time-series data prior to clustering such that all metric values included in the time-series data fall between specified limits. For example, the analytics engine 324 could normalize the time-series data such that all metric values included in the time-series data fall between 0.0 and 1.0 inclusive. The analytics engine 324 then determines if any one or more content servers 110 is a new outlier server. For example, the analytics engine 324 could determine that a content server 110, not previously identified as an outlier server, is represented by a time series that has failed to be included in a cluster for three consecutive analysis periods or for three of the most recent five analysis periods.

If the analytics engine 324 identifies one or more new outlier servers, then the analytics engine 324 performs one or more corresponding actions or operations to remediate the new outlier server. Such responsive actions include, without limitation, transmitting an email or a page to a system operator, collecting forensic data with respect to the outlier server for further analysis, taking the outlier server offline, rebooting the server, or terminating operation of the outlier server. In the case of taking an outlier server offline, such an outlier server continues to operate, but no longer receives requests from clients. In this manner, the outlier server can be subjected to further analysis to determine why the outlier server deviated from an expected operating behavior. In some embodiments, the analytics engine 324 may receive an indication that the new outlier server should be considered as an expected outlier server. In such embodiments, the analytics engine 324 identifies the new outlier server as an additional expected outlier server. In some embodiments, if a previously identified outlier server changes behavior such that the time series corresponding to the outlier server can be clustered with other time series for a threshold number of analysis periods, then the analytics engine 324 may identify the server as no longer being an outlier server.

It will be appreciated that the system shown herein is illustrative and that variations and modifications are possible. For example, the system described herein performs analysis during discrete durations of time, referred to herein as analysis periods. The duration of the analysis period could be varied so long as the duration is sufficiently long to prevent short aberrations or "noise" in the relevant metrics is not interpreted as indicative of an outlier server. Similarly, the duration of the analysis period should be sufficiently short to avoid long delays in detecting and remediating new outlier servers. Alternatively, the analytics engine 324 analyzes the relevant metrics for the content servers 110 in real time, thereby continuously analyzing metric data as the data are collected. Further, existing data could be used as training data in parallel with the approaches described herein. That is, although DBSCAN does not require a previously analyzed training data set, such a training data set could provide improved performance when used in conjunction with DBSCAN. That is, the analytics engine 324 may combine the data from one or more training data sets with the aggregated time-series data from the data aggregation engine 322 to provide improved outlier server detection, relative to either of these techniques when used alone.

Figure 4:
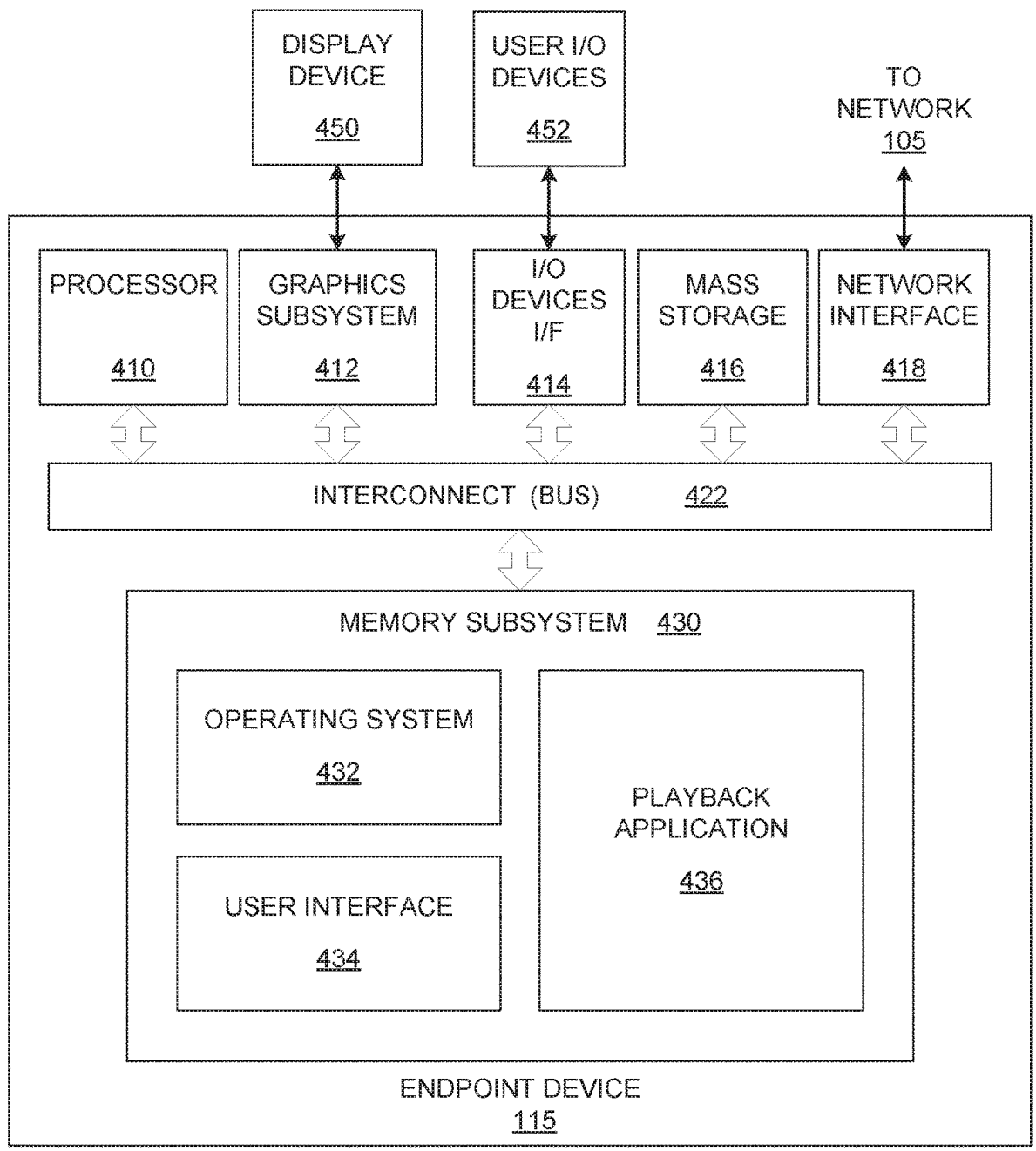
FIG. 4 is a more detailed block diagram of the endpoint device of FIG. 1, according to various embodiments of the present invention.

FIG. 4 is a more detailed block diagram of the endpoint device 115 of FIG. 1, according to various embodiments of the present invention. As shown, the endpoint device 115 includes, without limitation, a processor 410, a graphics subsystem 412, an I/O device interface (I/F) 414, a mass storage unit 416, a network interface 418, an interconnect 422, and a memory subsystem 430.

The processor 410 may be any technically feasible form of processing device configured process data and execute program code. Processor 410 could be, for example, a central processing unit (CPU), a graphics processing unit (GPU), an application-specific integrated circuit (ASIC), a field-programmable gate array (FPGA), and so forth. In some embodiments, the processor 410 is configured to retrieve and execute programming instructions stored in the memory subsystem 430. Similarly, the processor 410 is configured to store and retrieve application data (e.g., software libraries) residing in the memory subsystem 430. The interconnect 422 is configured to facilitate transmission of data, such as programming instructions and application data, between the processor 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the processor 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the processor 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. A television is an example of a device known in the art that can display video frames and generate an acoustic output.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the processor 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

Server Outlier Detection

Figure 5A:
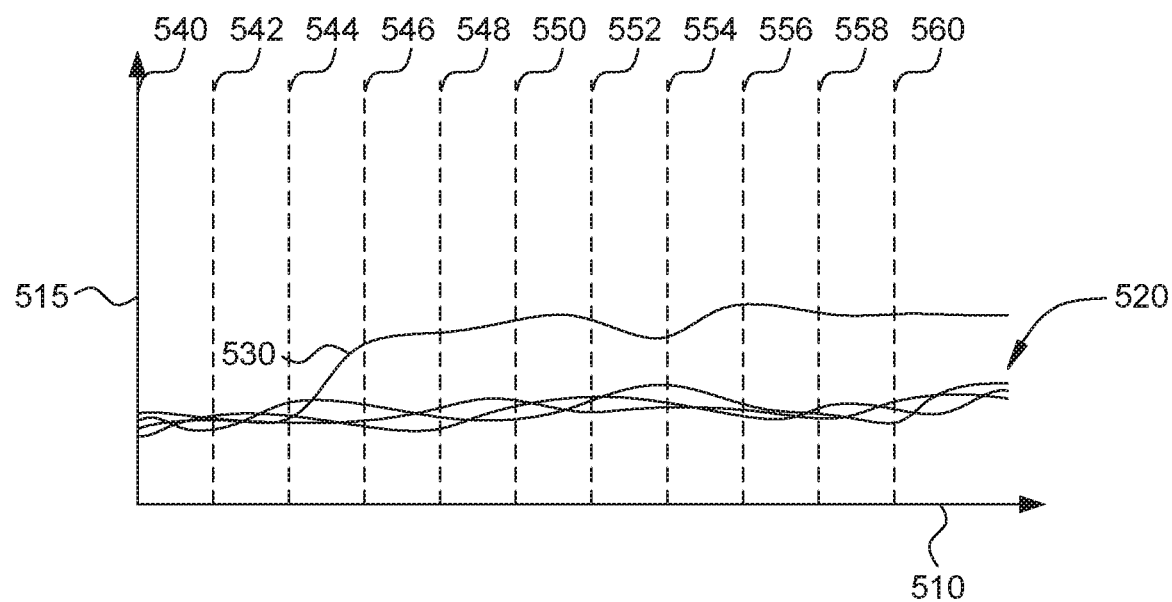
FIGS. 5A-5B are graphs depicting the behavior over time of various performance metrics associated with a group of servers within a distributed computer system, according to various embodiments of the present invention.
Figure 5B:
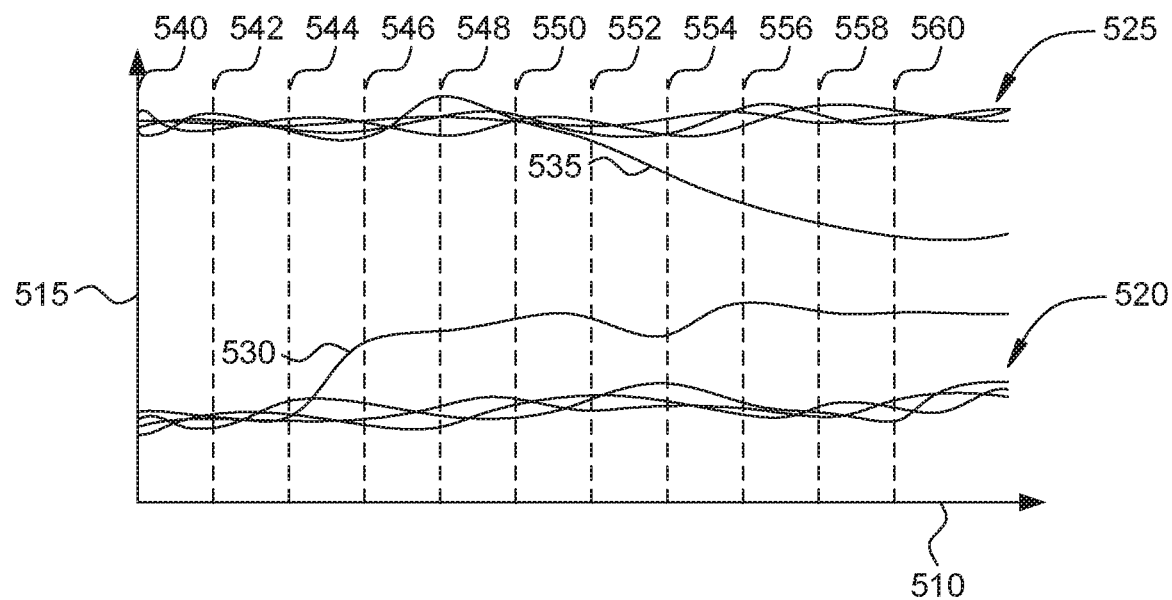

FIGS. 5A-5B are graphs depicting the behavior over time of various performance metrics associated with a group of servers within a distributed computer system, according to various embodiments of the present invention.

As shown in FIG. 5A, the graph includes, without limitation, a first cluster 520 of time series. Each time series in the cluster 520 represents a metric under analysis for a different server in a group of servers. The x-axis 510 of the graph represents time, while the y-axis 515 of the graph represents the metric under analysis. In some embodiments, the metric is a composite metric that represents a combination of one or more metrics. At time 550, the analysis engine 324 causes the time-series data between time 540 and time 550 to be displayed on a display device. During the time periods from time 540 to time 542 and from time 542 to time 544, the analysis engine 324 determines that there are four time series included in the first cluster 520, corresponding to four different servers in the group of servers. During the next three time periods from time 544 to time 546, from time 546 to time 548, and from time 548 to time 550, the analysis engine 324 determines that the time series 530 for one of the servers represented by cluster 520 has a metric value that is significantly higher than the metric value for the other three time series in the first cluster 520. If the analysis engine 324 receives an indication that one outlier server is present during the time period from time 540 to time 550, then the analysis engine 324 identifies the server corresponding to time series 530 as an outlier server. During each incremental analysis period after time 550, the analysis engine 324 continues to identify time series 530 as corresponding to an outlier server and the other three time series as part of the first cluster 520.

As shown in FIG. 5B, the graph includes, without limitation, a first cluster 520 of time series and a second cluster 535 of time series. Each time series in the cluster 520 represents a metric under analysis for a different server in a first group of servers. Correspondingly, each time series in the cluster 525 represents the metric under analysis for a different server in a second group of servers. The x-axis 510 and the y-axis 515 of the graph are describes in conjunction with FIG. 5A. At time 550, the analysis engine 324 causes the data between time 540 and time 550 to be displayed on a display device. During the time periods from time 540 to time 542 and from time 542 to time 544, the analysis engine 324 determines that there are four time series included in the first cluster 520, corresponding to four different servers in the first group of servers. Likewise, during the time periods from time 540 to time 542 and from time 542 to time 544, the analysis engine 324 determines that there are four time series included in the second cluster 525, corresponding to four different servers in the second group of servers. During the time period from time 540 to time 550, the analytics engine 324 determines that time series 530 corresponds to an outlier server, as described in conjunction with FIG. 5A.

After time 550, the analytics engine 324 clusters the time series during each incremental analysis period to determine whether additional outlier servers are found. During the incremental analysis period from time 552 to time 554, the analytics engine 324 determines that the metric value for time series 535, corresponding to one of the servers represented by the second cluster 525, is significantly lower than the metric value for the other three servers represented by the second server cluster 525. During each of the following incremental analysis periods from time 554 to time 556, time 556 to time 558, and time 558 to time 560, the analytics engine 324 likewise determines that the metric value for time series 535 is significantly lower than the metric value for the other three time series in the second cluster 525. When the analytics engine 324 determines that the metric value for time series 535 is significantly lower for a threshold number of analysis periods, the analytics engine 324 determines that the server corresponding to time series 535 is an outlier server. For example, if the threshold number of analysis periods is three, then, at time 558, the analytics engine 324 determines that the server corresponding to time series 535 is an outlier server. The analytics engine 324 then remediates the identified outlier server by performing one or more remedial actions or operations, as further described herein.

Figure 6:
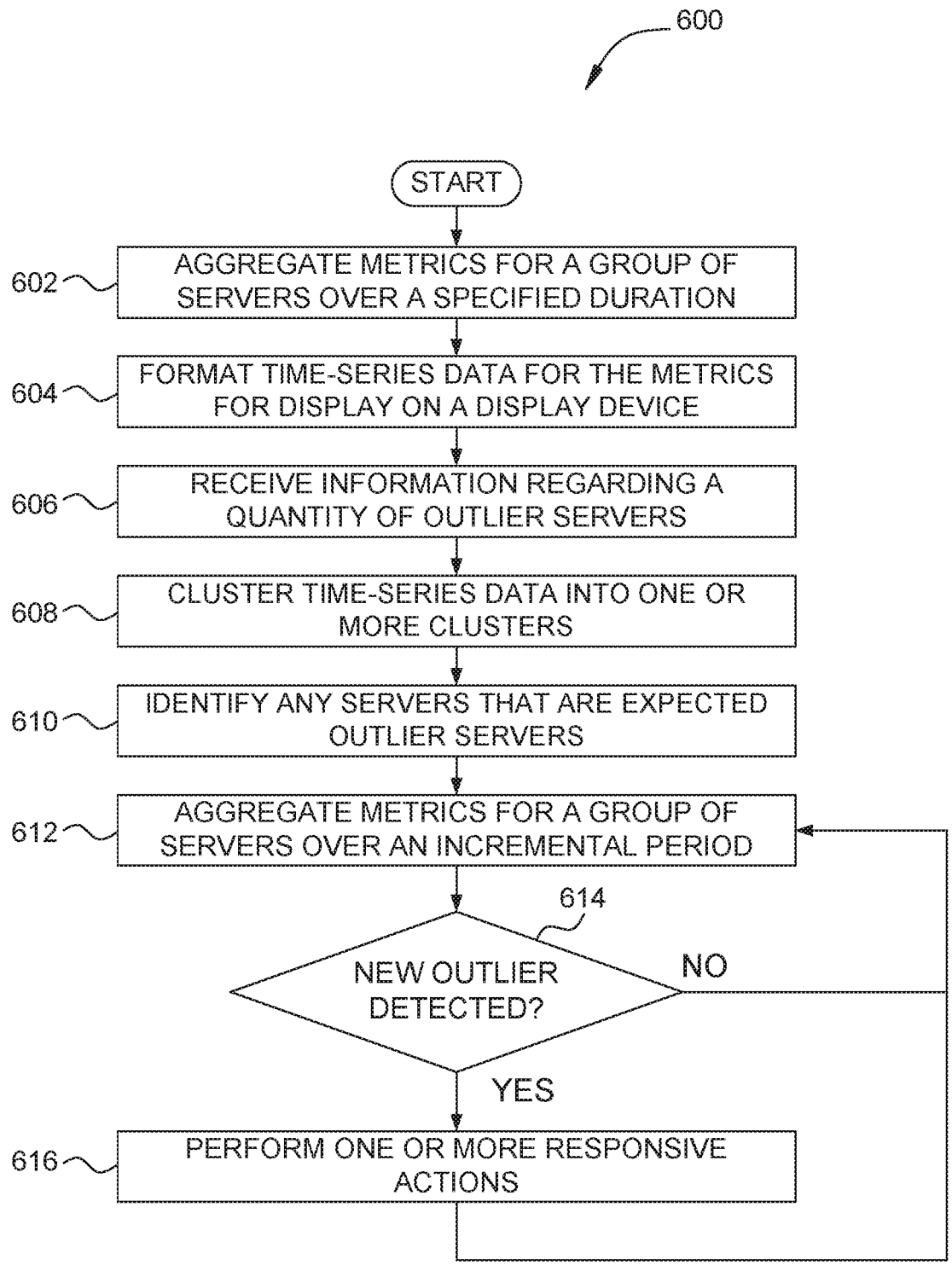
FIG. 6 is a flow diagram of method steps for detecting and remediating an outlier server in a distributed computer system, according to various embodiments of the present invention.

FIG. 6 is a flow diagram of method steps for detecting and remediating an outlier server in a distributed computer system, according to various embodiments of the present invention. Although the method steps are described in conjunction with the systems of FIGS. 1-4, persons skilled in the art will understand that any system configured to perform the method steps, in any order, is within the scope of the present invention.

As shown, a method 600 begins at step 602, where the aggregation engine 322 aggregates one or more metrics for a group of servers over a specified duration. In some embodiments, the one or more metrics may be specified by a user, such as a system operator. The one or more metrics include any relevant metrics related to server performance, including, without limitation, response latency, error rate, processor utilization, memory utilization, and system disk utilization. At step 604, the analytics engine 324 formats the aggregated time-series data of the one or more metrics for display on a display device. In some embodiments, the analytics engine 324 may combine multiple metrics into a single composite metric for display. The analytics engine 324 computes the composite metric via any technically feasible technique, including, without limitation, a sum of the individual metrics, a simple average of the individual metrics, and a weighted sum of the individual metrics.

At step 606, the analytics engine 324 receives information regarding a specific quantity of outlier servers present in the group of servers based on the aggregated time-series data formatted for display. In some embodiments, a user, such as a system operator, may identify that the aggregated metrics, as displayed, includes data for a specific quantity of outlier servers, such as zero, one, or two outlier servers. At step 608, the analytics engine 324 clusters the time series corresponding to a group of servers into one or more clusters, based on the aggregated time-series data for the metrics and the specified quantity of outlier servers. In some embodiments, the analytics engine 324 may normalize the time-series data prior to clustering such that all metric values included in the time-series data fall between specified limits. For example, the analytics engine 324 could normalize the time-series data such that all metric values included in the time-series data fall between 0.0 and 1.0 inclusive. The analytics engine 324 may cluster time-series data corresponding to the group of servers via any technically feasible approach, including, without limitation, DBSCAN, k-means clustering, and Gaussian-based models. The analytics engine 324 clusters the time-series data by varying parameters, such as the distance among the time series corresponding to the servers within a cluster and the minimum number of time series to be considered a cluster. The analytics engine 324 varies such parameters until the quantity of detected outlier servers is equal to the specified quantity of outlier servers. In some embodiments, the analytics engine 324 may perform the clustering and detection technique, as described in conjunction with steps 606-608, prior to formatting the aggregated time-series data of the one or more metrics for display on a display device, as described in conjunction with steps 604.

At step 610, the analytics engine 324 identifies any servers that are expected to be outlier servers. In some embodiments, the expected outlier servers may be specified by a user, such as a system operator. A particular server may be specified as an expected outlier server for various reasons, including, without limitation, the server is performing maintenance operations, the server is executing a test version of an application program that is different from a corresponding application program executed by other servers in the group of servers, and the server is known to have a hardware configuration that is different from other servers in the group of servers. At step 612, the aggregation engine 322 aggregates the one or more metrics for the group of servers over an incremental analysis period.

At step 614, the aggregation engine 322 determines whether a new outlier server is detected. In some embodiments, the aggregation engine 322 may detect a new outlier server by clustering the time-series data corresponding to the group of servers over the incremental analysis period. In some embodiments, the analytics engine 324 may normalize the time-series data prior to clustering such that all metric values included in the time-series data fall between specified limits. For example, the analytics engine 324 could normalize the time-series data such that all metric values included in the time-series data fall between 0.0 and 1.0 inclusive. If the aggregation engine 322 detects a new outlier server, then the aggregation engine 322 compares the outlier servers detected for the incremental analysis period versus the outlier servers detected during the cluster operation of step 608 and any expected outlier servers identified in step 610. If all outlier servers detected over the incremental analysis period were previously detected or already identified as outlier servers, then the aggregation engine 322 concludes that no new outlier servers are detected. The method 600 then proceeds to step 612, described above.

If, however, at step 614, the aggregation engine 322 determines that at least one outlier server detected during the incremental analysis period was not previously detected as an outlier server and was not identified as an expected outlier server, then the aggregation engine 322 concludes that a new outlier server has been detected. The method 600 then proceeds to step 616, where the aggregation engine 322 performs one or more responsive actions or operations to remediate the new outlier server. Such responsive actions include, without limitation, transmitting an email or a page to a system operator, collecting forensic data with respect to the outlier server for further analysis, taking the outlier server offline, rebooting the server, or terminating operation of the outlier server. In some embodiments, the aggregation engine 322 may receive an indication that the new outlier server should be considered as an expected outlier server. In such embodiments, the aggregation engine 322 identifies the new outlier server as an additional expected outlier server. The method 600 then proceeds to step 612, described above.

In sum, a control server in a distributed computer system detects and remediates servers in a group of servers that are behaving in an uncharacteristic manner. The control server aggregates data for each server in the group of servers, where the aggregated data measures one or more relevant metrics over a period of time. The control server analyzes the aggregated data in order to cluster the time-series data corresponding to the servers in the group of servers into one or more clusters, where the servers corresponding to the time series in a particular cluster behave similarly with respect to the one or more relevant metrics. The control server detects whether one or more time series are not included in any of the clusters and identifies the servers corresponding to such time series as outlier servers. If the control server detects an outlier server, and the outlier server has not been previously identified as an expected outlier server, then the control server performs one or more corresponding actions or operations to remediate the outlier server. The corresponding actions or operations include transmitting an email or a page to a system operator, collecting forensic data with respect to the outlier server for further analysis, taking the outlier server offline, rebooting the server, or terminating operation of the outlier server.

At least one advantage of the disclosed techniques is that the control server automatically detects outlier servers based on one or more user-specified metrics and either takes the outlier server offline or terminates the outlier server after detection. The control server detects and remediates such outlier servers faster relative to prior techniques. As a result, clients experience improved performance for computer services delivered via a distributed computer system. Another advantage of the disclosed techniques is that, because the control server automatically detects and remediates outlier servers, less human interaction is needed to find and fix outlier servers, leading to reduced operating costs.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   retrieving a first plurality of time-series data sets associated with a first time period, wherein each time-series data set included in the first plurality of time-series data sets represents a performance metric for a different server included in a plurality of servers;
   generating a first plurality of clusters, wherein each cluster of the first plurality of clusters includes two or more of the time-series data sets included in the first plurality of time-series data sets, wherein each time-series data set included in a cluster is within a threshold distance from all other time-series data sets included in the cluster;
determining that a first time-series data set included in the first plurality of time-series data sets is not included in any cluster of the first plurality of clusters;
determining that the first time-series data set corresponds to a first server included in the plurality of servers;
determining that the first server was not previously marked as an outlier server;
determining that the first server was not previously marked as an expected outlier server; and
in response to determining that the first server was not previously marked as an outlier server and was not previously marked as an expected outlier server, marking the first server as an outlier server.

2. The method of claim 1, further comprising:
receiving an indication that a second server is expected to be an outlier server;
marking the second server as an expected outlier server.

3. The method of claim 2, wherein the indication indicates that the second server is performing a maintenance operation.

4. The method of claim 1, further comprising:
retrieving a second plurality of time-series data sets for a second time period, each time-series data set included in the second plurality of time-series data sets representing the performance metric for a different server in the plurality of servers; and
clustering at least a portion of the time-series data sets included in the second plurality of time-series data sets into a second cluster, wherein each time-series data set in the second cluster is within the threshold distance from all other time-series data sets included in the second cluster.

5. The method of claim 4, further comprising:
determining that a second time-series data set included in the second plurality of time-series data sets corresponds to the first server and is included in the second cluster; and
marking the first server as no longer an outlier server.

6. The method of claim 1, further comprising performing one or more remedial operations associated with the first server.

7. The method of claim 6, wherein the one or more remedial operations include at least one of:
transmitting a message to a second server that identifies the first server as an outlier server;
preventing the first server from receiving additional requests from an endpoint device;
terminating operation of the first server;
rebooting the first server; and
gathering forensic data associated with the first server for further analysis.

8. The method of claim 1, wherein the performance metric comprises a response latency, an error rate, a processor utilization, a memory utilization, or a system disk utilization.

9. A non-transitory computer-readable storage medium including instructions that, when executed by a processor, cause the processor to perform the steps of:
retrieving a first plurality of time-series data sets associated with a first time period, wherein each time-series data set included in the first plurality of time-series data sets represents a composite performance metric of two or more performance metrics for a different server included in a plurality of servers;
receiving an indication that one server included in the plurality of servers is a first outlier server;
generating a first plurality of clusters, wherein each cluster of the first plurality of clusters includes two or more of the time-series data sets included in the first plurality of time-series data sets, wherein each time-series data set included in a cluster is within a threshold distance from all other time-series data sets included in the cluster;
determining that a first time-series data set included in the first plurality of time-series data sets is not included in any cluster of the first plurality of clusters;
determining that the first time-series data set corresponds to a first server included in the plurality of servers;
determining that the first server was not previously marked as an outlier server;
determining that the first server was not previously marked as an expected outlier server; and
in response to determining that the first server was not previously marked as an outlier server and was not previously marked as an expected outlier server, marking the first server as an outlier server.

10. The non-transitory computer-readable storage medium of claim 9, further comprising:
receiving an indication that a second server is expected to be an outlier server;
marking the second server as an expected outlier server.

11. The non-transitory computer-readable storage medium of claim 10, wherein the indication indicates that the second server is performing a maintenance operation.

12. The non-transitory computer-readable storage medium of claim 9, further comprising:
retrieving a second plurality of time-series data sets for a second time period, each time-series data set included in the second plurality of time-series data sets representing the composite performance metric for a different server in the plurality of servers; and
clustering at least a portion of the time-series data sets included in the second plurality of time-series data sets into a second cluster, wherein each time-series data set in the second cluster is within the threshold distance from all other time-series data sets included in the second cluster.

13. The non-transitory computer-readable storage medium of claim 12, further comprising:
determining that a second time-series data set included in the second plurality of time-series data sets corresponds to the first server and is included in the second cluster; and
marking the first server as no longer an outlier server.

14. The non-transitory computer-readable storage medium of claim 9, wherein generating the first plurality of clusters comprises performing a density-based spatial clustering of applications with noise (DBSCAN) analysis on the first plurality of time-series data sets based on the threshold distance.

15. The non-transitory computer-readable storage medium of claim 14, further comprising determining a minimum cluster size for the DBSCAN analysis based at least in part on the two or more performance metrics.

16. The non-transitory computer-readable storage medium of claim 9, wherein the composite performance metric is based on two or more of a response latency, an error rate, a processor utilization, a memory utilization, and a system disk utilization.

17. A system, comprising:
a memory that includes a control application; and
a processor that is coupled to the memory and, upon executing the control application, is configured to:
- retrieving a first plurality of time-series data sets associated with a first time period, wherein each time-series data set included in the first plurality of time-series data sets represents a performance metric for a different server included in a plurality of servers;
- calculating a first threshold distance associated with the first plurality of time-series data sets based on the performance metric;
- generating a first plurality of clusters, wherein each cluster of the first plurality of clusters includes two or more of the time-series data sets included in the first plurality of time-series data sets, wherein each time-series data set included in a cluster is within the first threshold distance from all other time-series data sets included in the cluster;
- identifying a first subset of one or more time-series data sets included in the first plurality of time-series data sets that are not included in any cluster of the first plurality of clusters;
- identifying a first subset of one or more servers included in the plurality of servers, wherein each server included in the first subset of one or more servers corresponds to a different time-series data set included in the first subset of one or more time-series data sets;
- determining that at least one server included in the first subset of time-series data sets was not previously marked as an outlier server and was not previously marked as an expected outlier server; and
- in response to determining that the at least one server was not previously marked as an outlier server and was not previously marked as an expected outlier server, marking the at least one server as an outlier server.

18. The system of claim 17, further comprising:
receiving a value representing a quantity of servers included in the plurality of servers that are outlier servers;
determining that a quantity of time-series data sets included in the first subset of one or more time-series data sets exceeds the value; and
calculating a second threshold distance associated with the first plurality of time-series data sets; wherein the second threshold distance is greater than the first threshold distance.

19. The system of claim 18, further comprising:
generating a second cluster that includes two or more of the time-series data sets included in the first plurality of time-series data sets, wherein each time-series data set included in the second cluster is within the second threshold distance from all other time-series data sets included in the second cluster;
identifying a second subset of one or more time-series data sets included in the first plurality of time-series data sets that are not included in the second cluster; and
determining that a quantity of time-series data sets included in the second subset of one or more time-series data sets is equal to the value.

* * * * *